United States Patent

Wagstaff et al.

[11] Patent Number: 5,886,951
[45] Date of Patent: Mar. 23, 1999

[54] METHOD FOR ENHANCING SIGNAL-TO-NOISE RATIO AND RESOLUTION OF AMPLITUDE STABLE SIGNALS

[76] Inventors: Ronald A. Wagstaff, 304 Tumblebrook, Slidell, La. 20461; Susan D. Gardner, 125 B Ct. St., Bay St. Louis, Miss. 39520

[21] Appl. No.: 917,964
[22] Filed: Aug. 27, 1997
[51] Int. Cl.[6] .................................................. H04B 1/06
[52] U.S. Cl. ........................ 367/135; 367/119; 367/901; 367/124
[58] Field of Search .................................... 367/135, 136, 367/103, 105, 119, 121, 123, 124, 125, 129, 901; 364/724.06, 724.08, 726.01, 726.02, 726.03, 574

[56] References Cited

U.S. PATENT DOCUMENTS 5,430,690  7/1995  Abel ......................................... 367/135
5,432,753  7/1995  Maranda ................................. 367/135

*Primary Examiner*—Daniel T. Pihulic
*Attorney, Agent, or Firm*—Thomas E. McDonnell; Edward Miles; Alan Klein

[57] ABSTRACT

A method for enhancing signal-to-noise ratio and resolution of amplitude stable signals wherein underwater acoustic data is first collected with an array of hydrophones, and then the data is digitally sampled. After producing spectra of sequential time snapshots of the digitally-sampled data, the spectra are beamformed for a single frequency. Next the low resolution beamformer response is deconvolved from the data by use of a calculated beam response pattern for the hydrophone array, so that many high-resolution estimates are created for each time snapshot. Finally, the resulting high resolution estimates are reduced to a single estimate for each spatial bin across all of the time snapshots, and the high resolution, high gain results are displayed.

10 Claims, 7 Drawing Sheets

METHOD FOR ENHANCING SIGNAL-TO-NOISE RATIO AND RESOLUTION OF AMPLITUDE STABLE SIGNALS

BACKGROUND OF THE INVENTION

The present invention relates generally to electrical communications, and more particularly to signal processing methods.

High-resolution processing techniques do not always produce significant amounts of gain in the signal-to-noise ratio (SNR) of input underwater acoustic signal and noise data. Further SNR gain improvements normally require an additional technique specifically designed to produce high gain. A signal processing method that simultaneously improves both resolution and SNR gain would be particularly useful for underwater applications that benefit from both resolution and gain improvements.

In the case of underwater acoustics, natural fluctuations in the signal and the noise across time are caused by many factors, including multipath transmission, internal waves, acoustic propagation path interaction with the moving sea surface, and source-receiver relative motion. The advanced WISPR (Wagstaff's Integration Silencing Processor) summation (AWSUM) filter disclosed in Application Ser. No. 08/314,281, filed Sep. 30, 1994, by Wagstaff as sole inventor, and currently pending, the disclosure of which is hereby incorporated by reference, is a signal processing algorithm that has been found to increase the SNR for low-fluctuation amplitude tonal (LOFAT) signals embedded in high-fluctuation amplitude tonal (HIFAT) signals and noise by attenuating the highly fluctuating components more than the LOFAT signals. LOFAT signals are an important class of man-made signals in the ocean, and the AWSUM filter can provide significant gains for automatically detecting and classifying those signals (e.g. projector at the surface or submerged).

SUMMARY OF THE INVENTION

Accordingly, it is an object of the present invention to simultaneously improve both resolution and SNR gain of input underwater acoustic signal and noise data.

This and other objects of the present invention are achieved by a method for enhancing signal-to-noise ratio and resolution of amplitude stable signals wherein underwater acoustic data is first collected with an array of hydrophones, and then the data is digitally sampled. After producing spectra of sequential time snapshots of the digitally-sampled data, the spectra are beamformed for a single frequency. Next, the low resolution beamformer response is deconvolved from the data by use of a calculated beam response pattern for the hydrophone array, so that many high-resolution estimates are created for each time snapshot. Finally, the resulting high resolution estimates are reduced to a single estimate for each spatial bin across all of the time snapshots, and the high resolution, high gain results are displayed.

The method combines the fluctuation sensitivity of the WISPR and AWSUM filters with a deconvolution method that improves signal resolution. The result is a method where SNR gain and increased resolution are achieved simultaneously for LOFAT signals. It will also enhance the resolution of HIFAT signals, but the gain will be less than for LOFAT signals.

Additional advantages and features will become apparent as the subject invention becomes better understood by reference to the following detailed description when considered in connection with the accompanying drawings, wherein:

FIGS., 7(a), 7(b) and 7(c) show a comparison of processor outputs for a) AVGPR and MEM(63) methods, b) AVGPR and DIET AWSUM methods, and c) AVGPR, MEM(63), and DIET AWSUM.

DETAILED DESCRIPTION

Figure 1:
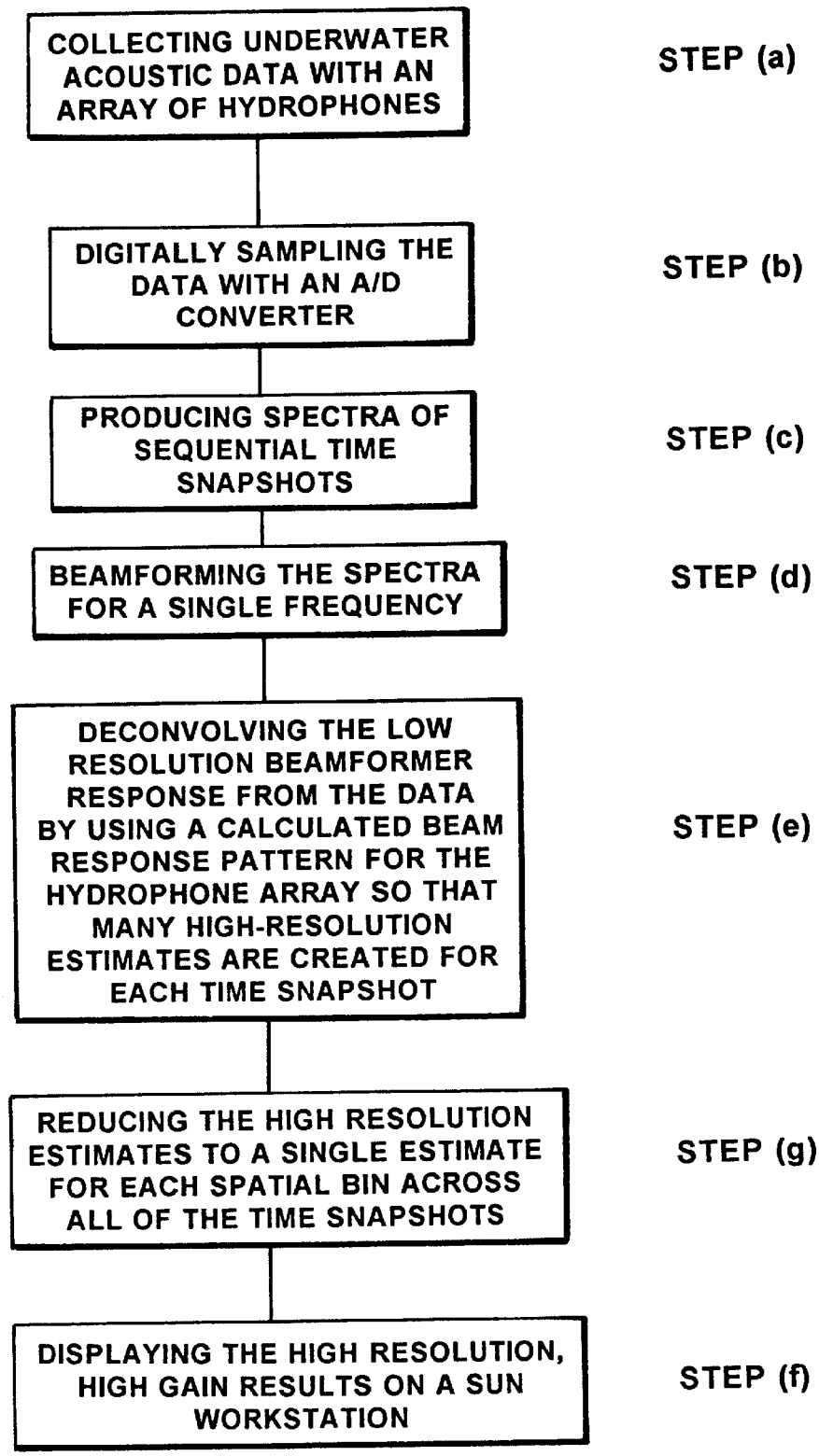
FIG. 1 is a flow chart for the high resolution, high gain method of the invention.

Referring to FIG. 1, the method for enhancing signal-to-noise ratio and resolution of amplitude stable signals comprises seven steps, which hereinafter will be designated steps (a) through (g).

The first step (a) is collecting underwater acoustic data with an array of hydrophones.

The second step (b) is digitally sampling the data with an analog-to-digital (A/D) converter.

The third step (c) is producing spectra of sequential time snapshots (i.e., individual time intervals) with a spectrum analyzer.

The fourth step (d) is beamforming the spectra, in this case, for a single frequency.

The fifth step (e) is deconvolving the low resolution beamformer response from the data by using a calculated beam response pattern for the hydrophone array, so that many high-resolution estimates are created for each time snapshot. By "deconvolving" is meant "removing by way of comparison."

The sixth step (f) is reducing the high resolution estimates to a single estimate for each spatial bin across all of the time snapshots. A WISPR or AWSUM calculation accomplishes this data reduction while also contributing high gain capability to the processor.

The seventh step (g) is displaying the high resolution, high gain results on a SUN Workstation.

The method will work in both the spectral and the spatial domains. However, the need for improved resolution is usually the greatest in the spatial domain because of limitations that are often placed on the number of hydrophone array elements and the size of the array that can be used. Those limitations often result from excessive system costs, insufficient signal coherence length, engineering constraints, or environmental incompatibilities. Engineering construction may be impractical or impossible for the apertures necessary to get the resolution desired. Environmental incompatibilities occur when the desired vertical length exceeds the water depth, when there is difficulty keeping the elements fixed, or when the elements are perturbed by differential currents making their true positions unknown. Because of the multiple obstacles impairing good spatial resolution, the new method presented herein will be demonstrated in the spatial domain where the need is considered to be the greatest.

A more thorough discussion of the method follows, beginning with a brief description of the WISPR and AWSUM Filters. Next, a pictorial illustration of the method is given, followed by a step of normalization or scaling. Finally, the approach and application of this method to experimental data are presented.

THE WISPR AND AWSUM FILTERS

A simple description of both the WISPR and AWSUM Filters begins with the equation for the WISPR Filter power, $W(x)$, $$W(\chi) = \left[ \frac{1}{N} \sum_{i=1}^{N} (\chi_i)^{-1} \right]^{-1}, \quad (1)$$

where N is the total number of data points in an input data set (e.g., beam noise data time history) and $x_i$, represents the ith realization of the power. Given an input data set with both high and low values, because of the nature of the reciprocal where large things become small and vice versa, the WISPR Filter weights the lower values in the input data set more heavily. The WISPR Filter's ability to favor signals with low fluctuations embedded in highly fluctuating noise is a direct result of this characteristic. Highly fluctuating noise will have deeper downward excursions than the more stable signals which have smaller downward excursions. Because the WISPR Filter returns a low value, the filter output for the highly fluctuating noise will favor the larger downward excursions that are not as prominent in the more stable signal, therefore returning an overall lower estimate for the more highly fluctuating noise inputs. This process effectively increases the SNR between the highly fluctuating noise and the more stable signal.

The AWSUM Filter is a general expression that includes the WISPR Filter as a special case when a=1. The AWSUM Filter power, A(x), is:

$$A(\chi) = \left[ \frac{1}{N} \sum_{i=1}^{N} (\chi_i)^{-a} \right]^{-\frac{1}{a}}, \quad (2)$$

where a, the order of the sum or AWSUM order number, is a real number greater than zero. As the AWSUM order number becomes larger, the smaller values become more important, increasing the downward bias of the sum.

The WISPR and AWSUM Filters are incorporated in the inventive method to take advantage of those filters' fluctuation sensitivity. A description of how that is done to produce the DIET WISPR and DIET AWSUM methods follows.

PICTORIAL ILLUSTRATION OF THE METHOD

In order to generate a high resolution, high gain spatial density estimate, the spatial sampling interval must be much finer than the beam steering angles. However, it is convenient to have the beam steering angles a subset of the sampling chosen to represent the spatial density. Therefore, a multiple of the number of beams is chosen as a convenient number by which the resolution is made finer. Transformation from beam number space to spatial density space is simply a matter of multiplying the beam number by the transformation factor. By doing that, one can superimpose the high resolution spatial density result on the low resolution beam number versus beamformer output level plot to compare the results. For the examples used herein, the number of beams is 256; the transformation factor is four, and the resulting number of spatial density points is 1024 (i.e., 4×256).

Figure 2:
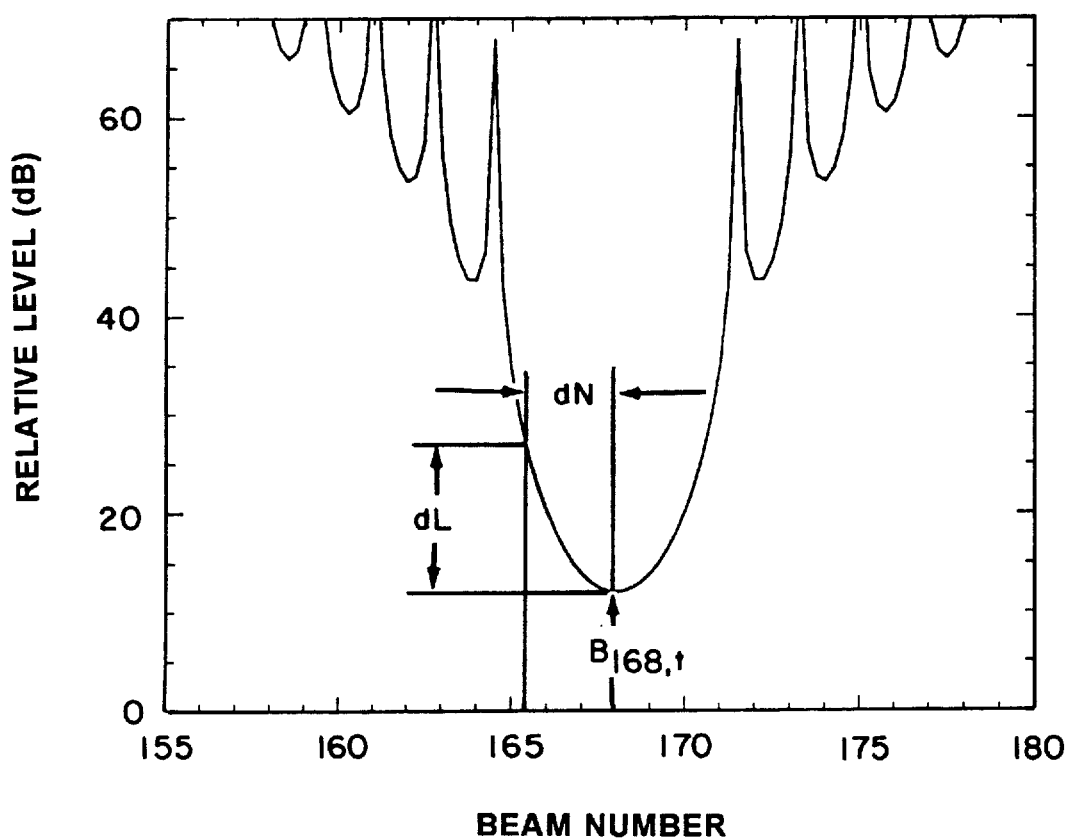
FIG. 2 is a typical theoretical beam pattern for Hann shading corresponding to the array data. The beam pattern is inverted and elevated to illustrate the mechanics of the DIET WISPR and DIET AWSUM algorithms.

The deconvolution technique utilizes the inverted beamformer response pattern as illustrated in FIG. 2. The x-axis is beam number and the y-axis is relative level. In this case, the beam response pattern is for Hann shading to be commensurate with the shading of the array used to acquire the data used herein. The beampattern is a continuous function, either theoretical or measured, that is sampled at 1024 points equally spaced across the 256 beam steering angles. The inverted pattern has been elevated to the level at which the boresight response (usually 0 dB in a normal pattern) is equal to the level that was measured. For this example, the level measured for beam number 168 at time t was $B_{168,t}$.

The rationale for using the inverted beam pattern elevated to the level that was measured is as follows. If a signal arrived at the beam steering angle (168 in this case) it would have had the level that was measured, $B_{168,t}$ and the level of the inverted and elevated beam pattern at the steering angle, or beam center, gives that signal level. However, if the signal was off to the side of the steering angle an amount dN (see FIG. 2), the signal would have had to be greater in level by an amount dL if it had arrived on beam center in order to give the level that was measured. The level dL is simply the beam response difference for being off beam center an amount dN. Hence the inverted and elevated beampattern defines the level that a signal must have at a given location to be solely responsible for the level that was measured on a given beam. In this example, the level $B_{168,t}$ is the level that would be required at spatial density location 4(168)-dN to produce a beamformer output at beam 168 equal to $B_{168,t}$. Furthermore, it is clear that this approach defines corresponding signal levels at each of the 1024 spatial density resolution points for each of the 256 beams, and that a similar set of signals is generated for each temporal sample.

The total data set that is generated by the previously described procedure consists of T (number of snapshots in time t) subsets. Each subset contains 1024 signals in spatial order $x_i$ that could have singularly produced the level that was measured on a given beam for a particular time t, and there are 256 such beams with their 1024 associated signals. Hence, for any one of the 1024 spatial density resolution points $x_i$, there will be 256 signal levels that come from the beampattern inversion process, which corresponds to 256 beams for each of T snapshots or 256 T signal levels. Each of those signal level subsets that correspond to spatial density location $x_i$ is operated on independent of other signal level subsets for a different x to create the high gain high resolution spatial density estimate.

Figure 3A:
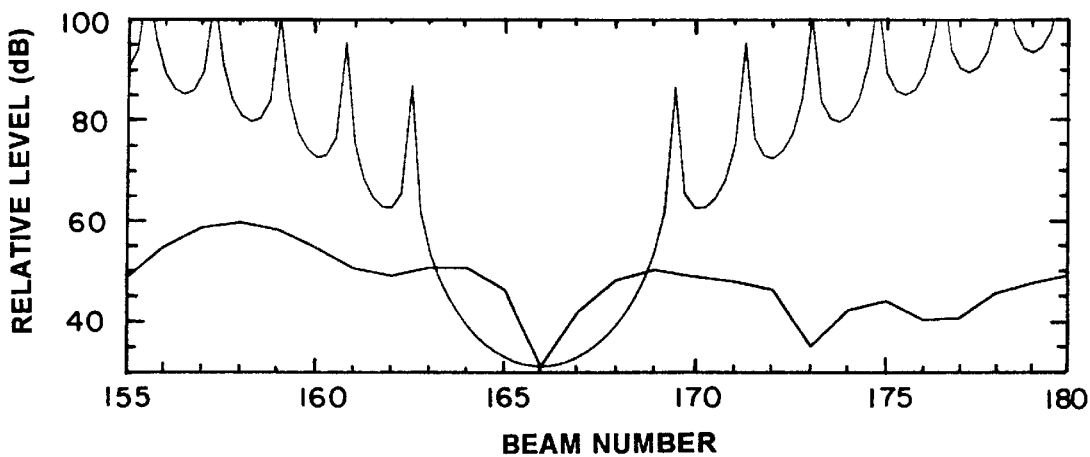
FIG. 3(a), 3(b) and 3(c) show mechanics of the DIET WISPR and DIET AWSUM methods with a) the beam pattern (FIG. 1) inverted and impressed on the data segment for one snapshot at beam number 166, b) the inclusion of a second inverted beam pattern at beam number 173, and c) the inclusion of additional inverted beampatterns and the beginning of a partial deconvolution result (bold curve).
Figure 3B:
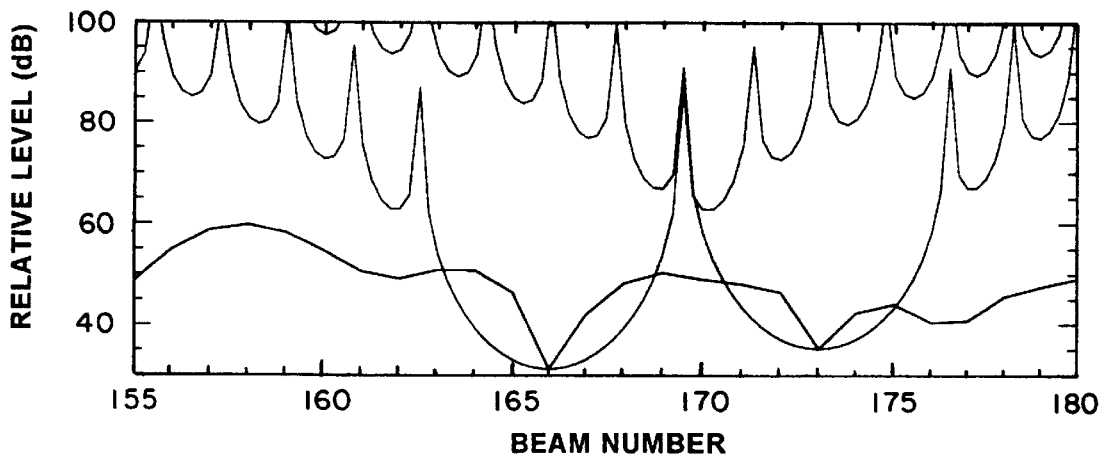
Figure 3C:
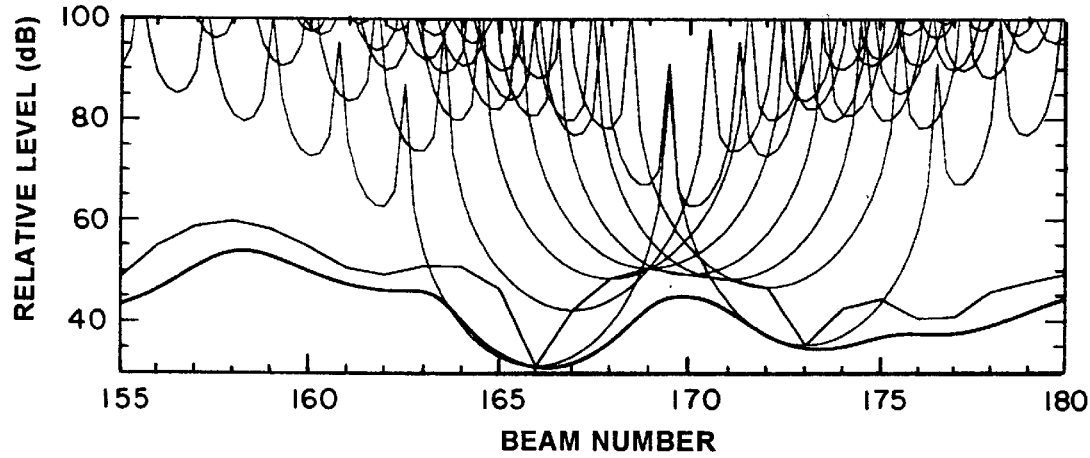

FIG. 3 illustrates the deconvolution step. FIG. 3a shows an inverted beam response pattern (top curve) elevated to the output level of beam number 166 and centered at that steering angle. It is interesting that the beam output level for beam numbers 164, 165, 167, 168, and 169 all exceed the corresponding levels that would be required at those locations to be solely responsible for the level that was measured on beam 166. Therefore, the final result must remove some of that "apparent" surplus signal. FIG. 3b illustrates the progression of the step as an additional inverted and elevated beam response pattern is included at beam number 173. Again, in this case, there are three beam output levels that exceed the boundary defined by the inverted and elevated beam pattern. FIG. 3c shows eight consecutive inverted and elevated beam response patterns.

The bold curve at the bottom of FIG. 3c shows the result that is obtained when all of the data are used for 256 beams and 1 snapshot in time. It was obtained by calculating a WISPR Filter value at each of the 1024 spatial density resolution points. That process is called DIET (Directivity Improved Estimation Technique) WISPR (denoted $DW(X_i)$) is defined by $$DW(\chi_i) = \left[ \sum_{t=1}^{T} \sum_{j=1}^{J} \{B_{j,t}/R_{j,t}(\chi_i)\}^{-1} \right]^{-1}, \quad (3)$$

where:

$X_i$ is the spatial density variable, i is the spatial density index (1-1024), $B_{j,t}$ is the beamformer output powers for the jth beam for time sample t, $R_{j,t\text{g}}(X_i)$ is the beam power spatial response of the jth beam at the ith location in spatial density space for time sample t, J is the total number of beams, and T is the total number of times (snapshots).

Equation 3 represents a self consistent high resolution, high gain estimate of the spatial density that is the unnormalized DIET WISPR estimate. Normalization is desirable when comparing results to accepted standards and will be discussed later.

Increased gain and resolution can be achieved through a similar process by placing a stronger emphasis on the fluctuations with the AWSUM Filter, creating DIET AWSUM (denoted $DA_a(X_i)$):

$$DA_a(\chi_i) = \left[ \sum_{t=1}^{T} \sum_{j=1}^{J} \{B_{j,t}/R_{j,t}(\chi_i)\}^{-a} \right]^{-1/a}, \quad (4)$$

where a is a real number that is greater than zero and is referred to as the AWSUM order number. Equation 4 describes the unnormalized DIET AWSUM method. Both DIET WISPR and DIET AWSUM estimates can be normalized if the results are to be compared to a particular reference value. One such normalization process is discussed below.

NORMALIZATION

To facilitate a comparison of the results from the new methods with results from other methods, the DIET results can be appropriately normalized. The data set represented by the average power level (AVGPR) curve in FIG. 4a contains an amplitude stable signal imbedded within the noise at a negative SNR. Its exact location can be found by using the output of the WISPR Filter in conjunction with the AVGPR result. The rationale by which that can be done is as follows.

Figure 4A:
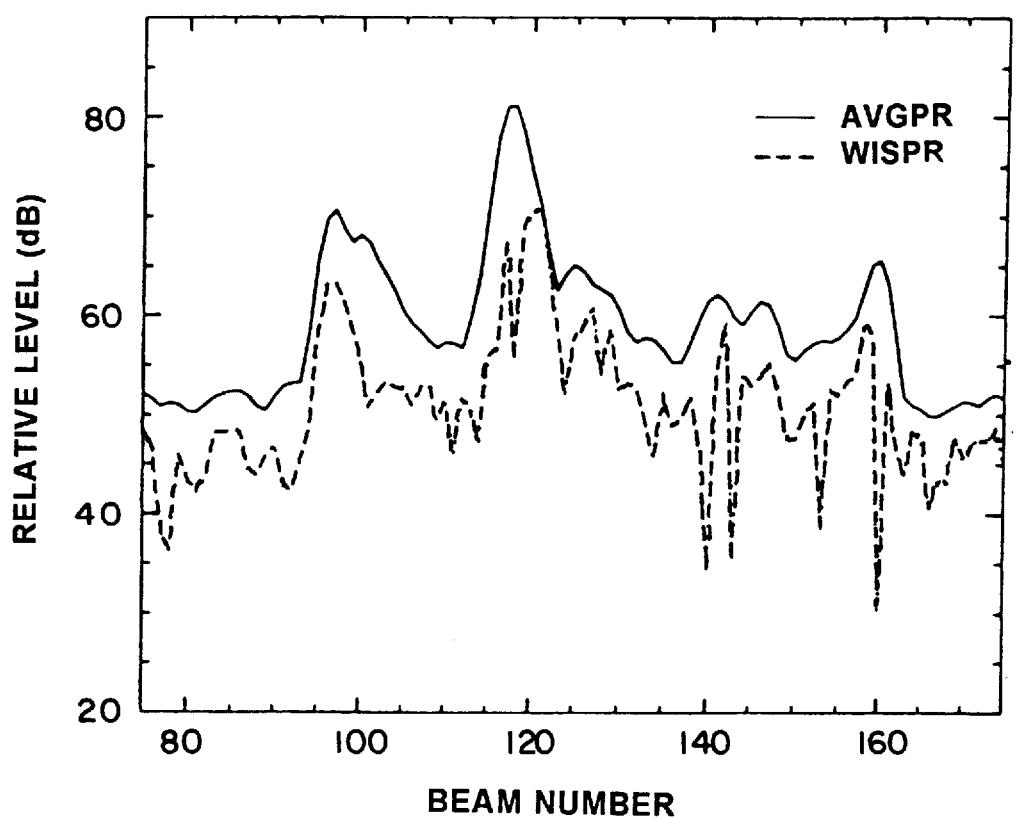
FIGS. 4(a) and 4(b) show stable signal identification from using a) average beamformer output level (AVGPR) and WISPR Filter output level versus beam number for a data set showing the effects of multiple discrete signals and background noise including a negative SNR stable signal at beam number 121, and b) the curve of the differences between the previous two curves.

The WISPR Filter is an attenuator that affects signals and noise in proportion to the amplitudes of their fluctuations. Experience has shown that for most signals and noise in the ocean, the amount of attenuation relative to AVGPR will range from less than a decibel to more than 9 dB. Many amplitude stable signals of interest are attenuated less than about 1.5 dB. Ambient noise in the ocean, on the other hand, is usually attenuated about 7 dB. This being the case, one approach to normalizing the DIET WISPR and DIET AWSUM results is to normalize the curves to the least attenuation level which can be expressed by:

$$\text{MIN}[AVGPR_j - WISPR_j], \quad (5)$$

where MIN represents the process of taking the minimum. AVGPR is the average power level (i.e., 10 log $AVGP_j$) for the jth steering angle, and $WISPR_j$ is the corresponding WISPR Filter level, and:

$$\text{MIN}[AVGPR_j - AWSUM_j] \quad (6)$$

where $AWSUM_j$ is the corresponding AWSUM Filter level. Once the minimum level is found, the DIET WISPR and DIET AWSUM curves are "pinned" at the steering angle of the minimum and at the corresponding AVG PR level minus the minimum difference. This then puts all three estimates in a common reference. Equation 5, the minimum difference between AVGPR and WISPR, is illustrated by FIG. 4a which gives curves for the AVGPR and WISPR Filter estimates (top and bottom respectively). Determining the steering angle where the difference is minimum between those two curves is a relatively easy task for the computer. However, in this case illustration of the process is not simple because of the broad range over which the AVGPR curve and the WISPR curve are nearly equal. The illustration of the process is aided by plotting the difference in FIG. 4b. Now the beam number and the minimum value, at beam number 121, are obvious.

Figure 5A:
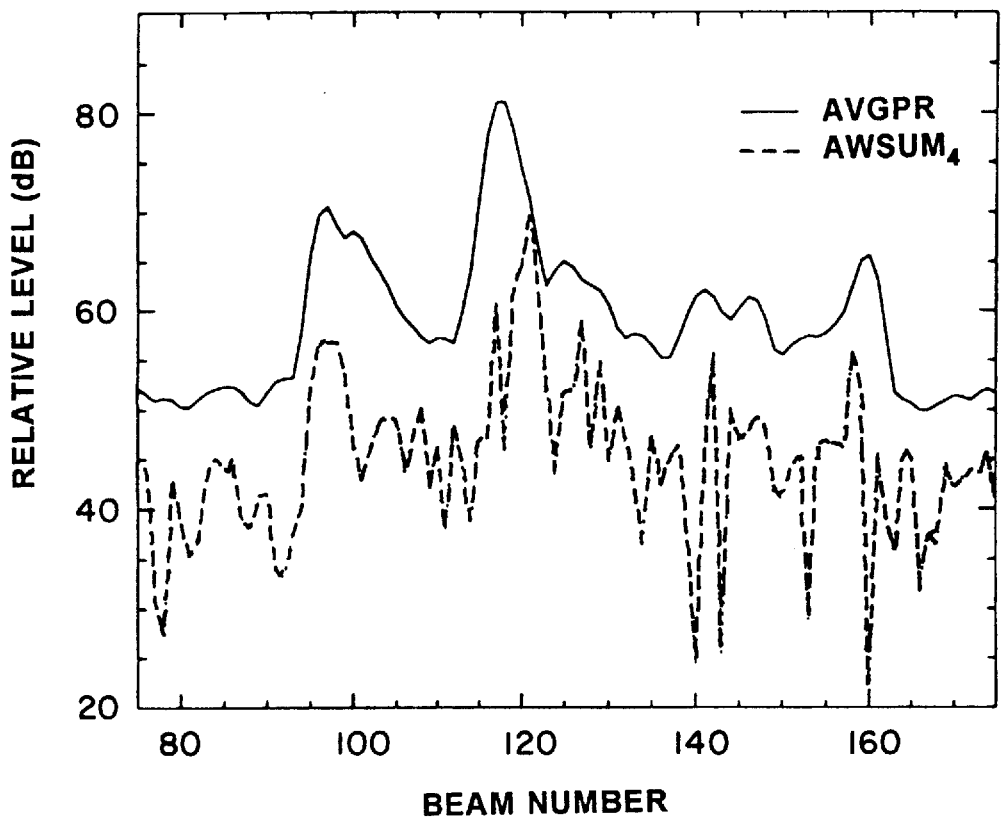
FIGS. 5(a) and 5(b) show stable signal identification from using a) average beamformer output level (AVGPR) and AWSUM Filter output level versus beam number for a data set showing the effects of multiple discrete signals and background noise including a negative SNR stable signal at beam number 121, and b) the curve of the differences between the previous two curves.
Figure 5B:
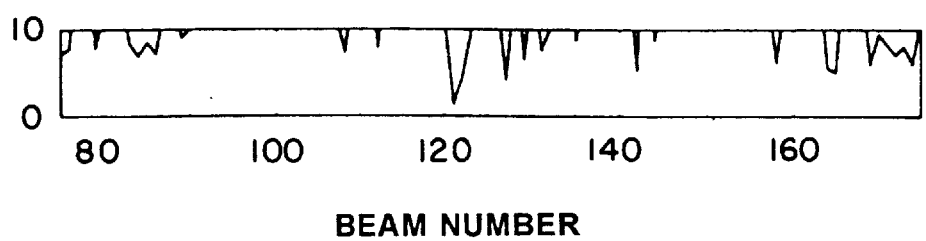

Equation 6, the minimum difference using AWSUM and corresponding AWSUM results are similarly given in FIGS. 5a and 5b. As before, the minimum difference is at beam 121.

DEMONSTRATION OF DIET WISPR AND DIET AWSUM METHODS

The DIET WISPR and DIET AWSUM methods are illustrated on measured data and compared to conventional power averaging and an accepted and well recognized high resolution technique. Conventional averaging was used as a common basis to bench mark the high resolution, high gain results. The measured data set was processed using autoregressive (AR) parametric modeling methods with the Burg algorithm, as described by Marple in *Digital Spectral Analysis With Application*, Prentice-Hall Inc., Englewood Cliffs, N.J. (1987), the disclosure of which is hereby incorporated by reference. AR methods are noted for producing power spectral density estimates with sharp peaks, therefore improving resolution for peaks that are real and not artifacts of the technique. The Burg algorithm, sometimes known as the Maximum Entropy Method (MEM), was chosen as a benchmark method for the present comparisons because it has been widely used and accepted.

Much of the software that produced the Burg parameters and the AR power spatial density estimates, or in this case the beam estimates, is based on FORTRAN code from Marple. The order of the model runs were chosen both by the criterion autoregressive transfer (CAT) function developed by Parzen in "Some Recent Advances in Time Series Modeling", IEEE Trans, Autom. Control, AC-19, pp. 723–730 (1974), the disclosure of which is hereby incorporated by reference, and by trial and error. Twenty consecutive temporal FFT output data sets were processed with the AR model. A simple power average for each beam was performed over twenty time samples (snapshots), producing the final MEM estimate. That estimate was normalized by equating the area under the power density curve with the total power of the conventional (low resolution) power average of the FFT beamformed data.

DIET WISPR, DIET AWSUM, and MEM were applied to a single data set, which was collected using a 144 element equally spaced horizontal line array. Beamforming was accomplished through a double fast Fourier transform (FFT) beamformer, a technique discussed by Williams in "Fast Beam-Forming Algorithm," J. Acoust. Soc. Amer., 44, pp. 1454–1455, (1968), the disclosure of which is hereby incorporated by reference. The first FFT was performed in the time domain on 2048 samples that were Hann weighted to provide a reasonable degree of frequency domain sidelobe suppression. Then, for the DIET WISPR and DIET AWSUM techniques, the complex frequency domain outputs of the first FFT for all 144 elements were collected together and padded with 112 zero values to form a 256 set of data points for a second, Hann shaded spatial FFT. This application of the FFT produced 256 amplitude values which were squared to give 256 beam power outputs, each corresponding to a different beam number (or steering angle). Twenty consecutive temporal data samples (temporal FFT output data sets) were beamformed, producing segments of time-sequential beam information to which DIET WISPR and DIET AWSUM were applied. The spectral data produced by the first FFT were also used as input for the Burg algorithm.

The conventional (low resolution) AVGPR of the 20 FFT beamformed segments is plotted in FIG. 4a. The AVGPR curve is the reference standard to which the other high resolution results will be compared. The power average shows several peaks, most notably a tall peak centered at about beam 117, the notched peaks at beams 95–100, and the lower level peak centered at 158. The breadth of the peaks at beams 95–100 and 117 compared to the main lobe of the beam response of the array (about 5 beam number spacing—see FIG. 2) suggests that they may be composites of multiple signals that are unresolved by a simple power average. Furthermore, previous knowledge of the experimental measurements and prior processing of that data set has indicated the presence of a stable tonal with a negative SNR (buried below the noise) at about beam number 121. These characteristics make that data set an attractive candidate for high-resolution techniques.

DIET WISPR—MEM

MEM was first used to find parameters for a 1024 point AR estimate of order 30 of the original 256 beams. This estimate is plotted with the conventional power average in FIG. 6a. The high resolution AR estimate is superimposed on the plot with the low resolution AVGPR beam data (with straight line interpolation to transform the 256 points in coarse beam number space to the finer 1024 point resolution) for comparison. The features of interest are at beams 95–100, 117, and 158. The MEM estimate shows improved resolution for all three large features in the low resolution curve. The broad regions of energy near beams 117 and 158 have been reduced to several single peaks. The broad feature at beams 95–100 has been split into multiple returns, and the Burg algorithm result has emphasized the left side of the feature, though the right side of the peak remains a strong feature. Of particular importance is that, although the resolution of the AR has increased, which gives a slight increase in the SNR gain, there has been no other substantial gain against the noise.

Figure 6A:
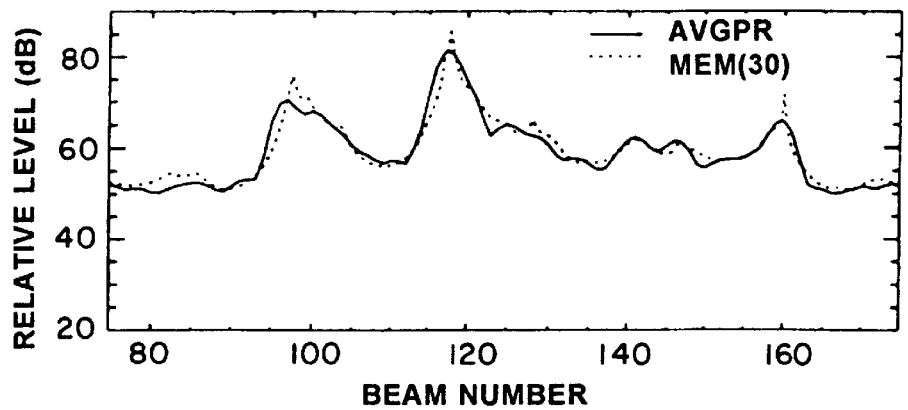
FIGS. 6(a), 6(b), and 6(c) show a comparison of processor outputs for a)AVGPR and MEM(30) methods, b) AVGPR and DIET WISPR methods, and c) AVGPR, MEM(30), and DIET WISPR.
Figure 6B:
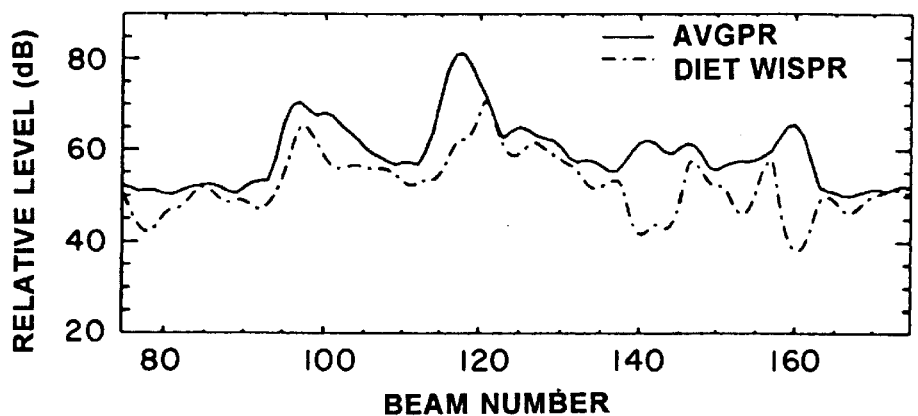

A 1024 point DIET WISPR estimate was also made from the original 256 beam, and is plotted with the AVGPR curve as the common reference in FIG. 6b. The three peaks noted in the power average are all affected by DIET WISPR. It is interesting that the local maxima in the AVGPR result at beam numbers 117, 140, and 160 have been attenuated from 20 to 27 dB. Such attenuation is not characteristic of a stable signal. The objective of the DIET WISPR method is to enhance the SNR and the resolution of stable signals. The difference plot (AVGPR-WISPR) in FIG. 4b indicates that there is a stable signal at beam number 121. The DIET WISPR results in FIG. 6b show a relative maximum at beam number 121 with fine resolution. The corresponding region in the AVGPR result shows no evidence of the stable signal. It obviously has a sufficiently negative SNR to be undetectable by the AVGPR processor.

Figure 4B:
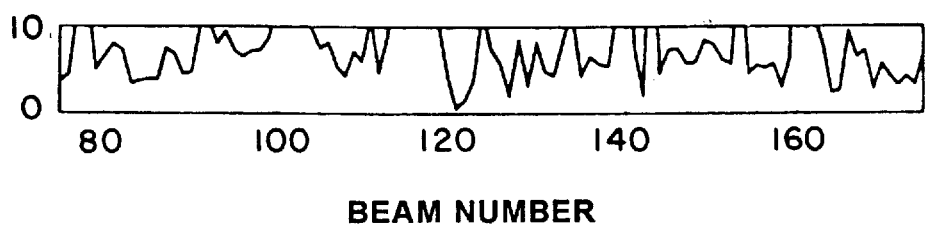
Figure 6C:
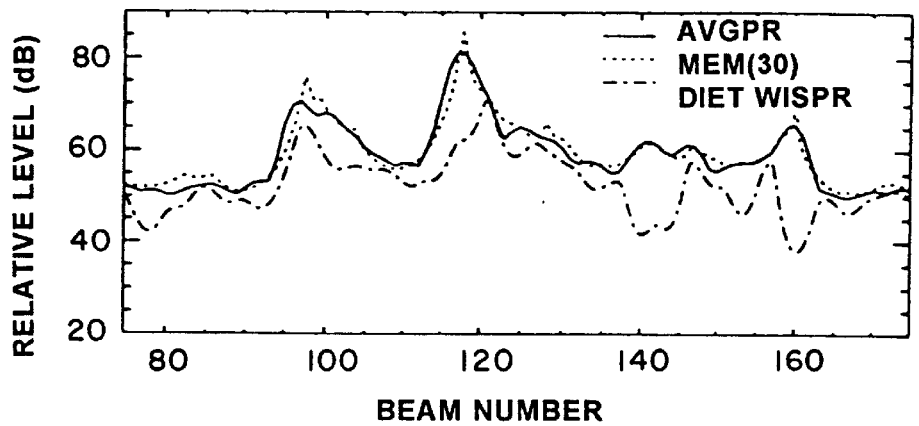

The conventional (AVGPR) result, the MEM result, and the DIET WISPR result have been plotted together in FIG. 6c. In comparing the various curves, several items should be noticed. While the MEM estimate generally produced sharper peaks the sensitivity of the DIET WISPR method to fluctuations caused it to eliminate the more highly fluctuating signal and noise components, thus producing better resolution of the one and only stable signal at beam number 121. At beam 160 the MEM and DIET WISPR results completely disagree. The Burg algorithm simply sharpened the return, while the DIET WISPR method identified it as unstable and severely attenuated it. An additional interesting result involves the return at beam 117. Both methods reduced the low resolution beam space result to a narrower peak. However, when plotted together it if clear that the original peak was composed of more than one signal or signal and noise. Only one of the signals proved to be stable, as seen in FIG. 4b. The MEM estimate was unable to discriminate between the stable signal and the other signal and noise and simply improved the resolution of the higher amplitude beamformer output near beam 117. However, the DIET WISPR result found the lower-amplitude, stable signal imbedded in the peak at about beam 121. In this example, the DIET WISPR method demonstrated its fluctuation sensitivity by properly locating the stable signal, improving its spatial resolution, and increasing its SNR gain while simultaneously substantially suppressing the less stable signals and noise. In terms of enhancing the resolution and increasing the SNR of the more stable signals at the expense of less stable signals and noise, the DIET WISPR algorithm produced more useful results.

DIET AWSUM—MEM

Figure 7A:
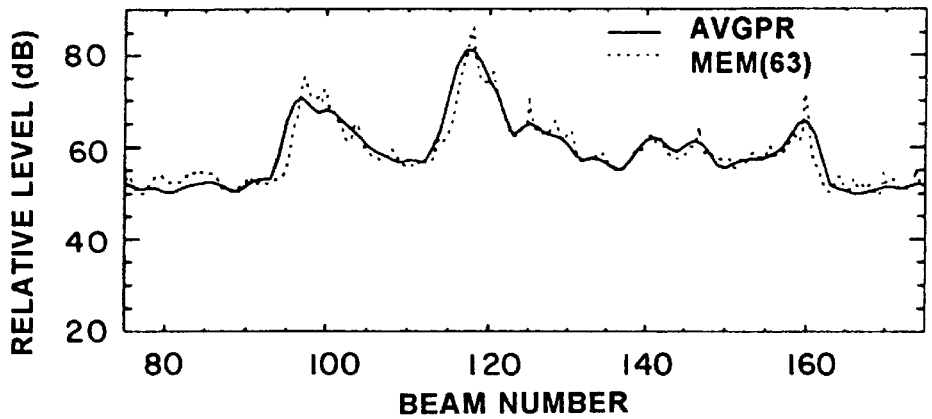

The CAT order selection technique was used to choose the appropriate number of Burg parameters for a second AR estimate. The order 63, suggested by CAT, was used to calculate the 1024 point estimate plotted with the conventional (low resolution) data in FIG. 7a. As before, where a high resolution estimate is plotted with the low resolution beam data, the finer 1024 point scale is used. The features of interest in FIG. 7a are found at beam steering angles 95–100, 117, and 158. The increased detail in this estimate, compared to the first AR(30) result in FIG. 6a, is not unexpected as the model order is more than double that used to calculate the first set of Burg parameters. In this estimate, the broad peaks at 95–100 and 117 have been separated into two or more distinct returns. The third feature, at beam 158 also shows much finer resolution than that seen in the AR(30) estimate of FIG. 6a. Spectral splitting, as discussed by Marple, is a known problem with higher order Burg estimates, and may be responsible for the apparent improved resolution in this example. However, the general shape of the two broad peaks suggests that they are composites of multiple returns. Therefore, the order of the model and the increased resolution appear to be reasonable.

Figure 7B:
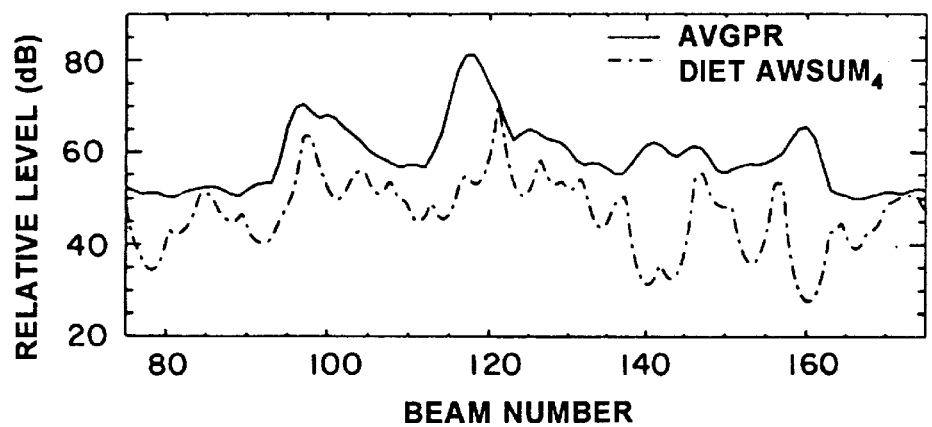

As with DIET WISPR, a 1024 point DIET AWSUM estimate of order 4 of the original 256 beams was calculated. The resulting estimate, shown in FIG. 7b, is similar to the DIET WISPR result in FIG. 6b, but with increased spatial resolution and SNR gain. As DIET WISPR result, the notched peak at beams 95–100 was resolved to a single, more distinct return associated with the left side of the peak. In addition, the peak at beam 158 was again completely eliminated, an indication of high fluctuations. The large broad peak at beam 117 was severely attenuated which caused the formation of a single, fine peak near the right side of the original feature at approximately beam 121. The resulting peak is coincident with the location of the stable signal that is known to be there and that was also identified by the DIET WISPR result. The most notable differences between the DIET WISPR and DIET AWSUM results are the increased resolution and higher SNR gain for the stable signals in the DIET AWSUM estimate. An additional observation is the large number of possible signals in the MEM results. Unfortunately, a method of establishing which peaks are truly signals and which are artifacts of the MEM algorithm is not known to the applicants.

Figure 7C:
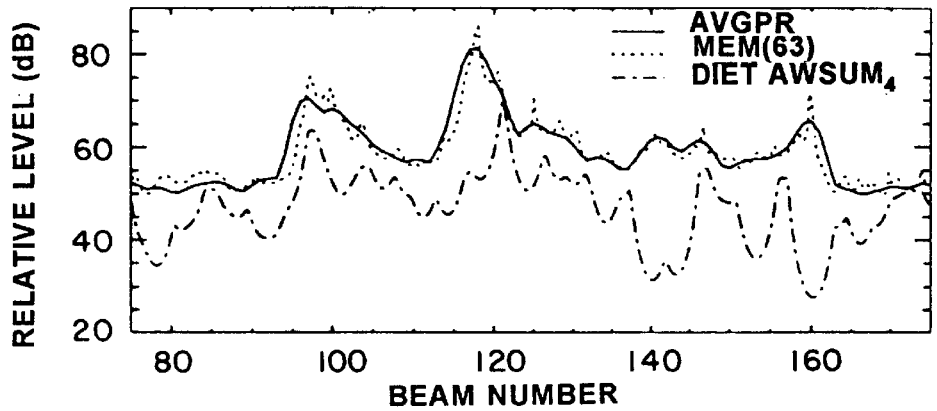

FIG. 7c shows the low resolution data with the Burg (MEM) and DIET AWSUM estimates. The resolution of the higher order AR(63) model appears more comparable to the fineness of structure in the DIET AWSUM result than the AR(30) estimate is comparable with the DIET WISPR result. As seen before, the most notable differences between the two DIET techniques occur because of DIET AWSUM's sensitivity to fluctuations. While the Burg result resolved multiple components in the peaks at beams 95–100 and 121, the DIET WISPR and DIET AWSUM results suggest that only the return at beam 95 shows the lower amount of fluctuation associated with stable signals. While the peak at beam 95 appears to have maintained an amplitude that is comparable to the peak at beam 121, the DIET AWSUM estimate at beam 95 is roughly 8 dB lower than the AVGPR value for the same beam, indicating that it is not as stable as one might guess based on it being a relative maximum. Two other areas exist where the differences between the DIET AWSUM curve and AVGPR curve are small (beams 86 and 174). These areas are in the virtual beam or non acoustic space and are probably produced by sidelobes from strong signals in the real beams (from beam 95 to beam 165), and are therefore ignored. As in the previous DIET WISPR result, the peak at 158 in the low resolution and Burg estimates is completely eliminated in the DIET AWSUM estimate.

DIET WISPR and DIET AWSUM, both fluctuation based signal processing algorithms, produced results that were significantly different from those obtained from the Burg (MEM) algorithm, which is not sensitive to the fluctuations. Each of the three methods demonstrated the ability to increase the resolution. However, the two DIET methods strongly biased the results in favor of the more stable signals, both enhanced the SNR, and both improved the resolution.

Utilization of the beam patterns is important in the DIET WISPR and DIET AWSUM to correct for system and processing effects on measured data, but the reciprocal summation (WISPR and AWSUM) process for exploiting the fluctuations is the real key to achieving the high resolution and high gain for LOFAT signals. Furthermore, as the magnitudes of the noise and HIFAT signal fluctuations increase, the resolution and the suppression gain also increase. Suppression gains of HIFAT signals and noise in excess of 20 dB have been achieved, especially for some of the higher orders of the DIET AWSUM processor. DIET WISPR and DIET AWSUM also increase the resolution of HIFAT signals but the SNR gain will not be as much as it is for the LOFAT signals.

As previously mentioned, the DIET WISPR and DIET AWSUM methods can also be used in the spectral domain. In addition, Both DIET WISPR and DIET AWSUM can be applied to multi-dimensional data with minimal modifications to provide increased stable signal identification capability and the flexibility to apply the technique in a variety of multi-dimensional situations. The ease of expansion to additional domains is illustrated by converting the one-dimensional DIET AWSUM processor of Eq. 4 into a two dimensional processor that would process data in both the spectral and spatial domains, potentially yielding high gain information useful for locating stable frequencies and their bearing simultaneously. The two-dimensional DIET AWSUM (which includes as a special case DIET WISPR when a=1), $DA_a(X_{i,k})$ is written:

$$DA_a(X_{i,k}) = \left[ \sum_{t=1}^{T} \sum_{j=1}^{J} \sum_{l=1}^{L} \{B_{l,j,t}/R_{l,j,t}(X_{i,k})\}^{-a} \right]^{-1/a} \quad (7)$$

where, for this example, the two dimensions represent the spatial and spectral domains and:

$X_{i,k}$ is the spatial spectral density variable, i is the spatial density index, k is the spectral density index, $B_{j,l,t}$ is the beamformer output powers for the jth beam at frequency 1 for time sample t, $R_{j,l,t}(X_{i,k})$ is the beam power spatial and spectral response of the jth beam and the lth frequency at the ith and kth location in spatial spectral density space for time sample t, J is the total number of beams, L is the total number of frequency bins, and T is the total number of times (snapshots).

With each new dimension a summation over the parameters in that new dimension (e.g. B and R) and the resolution space (x) are increased by one. For example, going from one dimension to two dimensions, the indices of B, R and x are increased by one (compare Eqs. 4 and 7). An additional summation (Σ) is included to cover each new dimension.

Generally, a simple, effective, and robust method for achieving high resolution and high gain has been presented. Both DIET WISPR and DIET AWSUM produce high resolution and high gain spectral density estimates of the power field incident at the array. The WISPR and AWSUM calculations on the inverted beam response patterns produce the increased resolution simultaneously as they produce the increased gain, which is achieved through exploitation of the temporal fluctuations in the consecutive time realizations. Because the beam response pattern of the data collection system is used, or its best approximation, the techniques are sensitive to system degradation and can minimize their degrading effects in the final results. This technique can be easily expanded to accommodate multi-dimensional data.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for enhancing signal-to-noise ratio and resolution of amplitude stable signals, comprising the steps of:

(a) collecting underwater acoustic data with an array of hydrophones;

(b) digitally sampling the data;

(c) producing spectra of sequential time snapshots of the digitally-sampled data;

(d) beamforming the spectra for a single frequency;

(e) deconvolving the low resolution beamformer response from the data by use of a calculated beam response pattern for the hydrophone array, so that many high-resolution estimates are created for each time snapshot;

(f) reducing the resulting high resolution estimates to a single estimate for each spatial bin across all of the time snapshots; and (g) displaying the high resolution, high gain results.

2. The method of claim 1 wherein step(e) includes the steps of:

estimating the power spectral density for each spatial bin from sequential time snapshots.

3. The method of claim 2 wherein step (e) includes the step of:

calculating the beam response pattern of the hydrophone array with fine spatial sampling.

4. The method of claim 3 wherein step (e) includes the step of:

inverting and elevating the beam response pattern for each power spatial density estimate from all time snapshots, whereby multiple high resolution spatial density estimates are created for each original beam and time snapshot.

5. The method of claim 1 wherein step (f) is accomplished with a WISPR filter.

6. The method of claim 5, wherein the equation for the WISPR Filter power, W(x), $$W(x) = \left[ \frac{1}{N} \sum_{i=1}^{N} (X_i)^{-1} \right]^{-1},$$

Where N is the total number of data points in an input data set, and $X_i$ represents the ith realization of the power.

7. The method of claim 1 wherein step (g) is accomplished with an AWSUM filter.

8. The method of claim 7, wherein the equation for the AWSUM Filter power, A(x), is:

$$A(x) = \left[ \frac{1}{N} \sum_{i=1}^{N} (X_i)^{-a} \right]^{-1/a},$$

where N is the total number of data points in an input data set, $x_i$ represents the ith realization of the power, and a, the order of the sum, is a real number greater than zero.

9. The method of claim 1 wherein step (d) is accomplished with a double fast Fourier transform beamformer.

10. The method of claim 1 wherein step (c) is accomplished with a spectrum analyzer.

* * * * *